April 15, 1952 E. M. BOWEN ET AL 2,593,254
MACHINE TOOL
Filed Aug. 2, 1946 5 Sheets-Sheet 2

INVENTORS
Earl M. Bowen
Arthur W. Johnson
By Carlson, Pitzner, Hubbard & Wolfe
ATTORNEYS

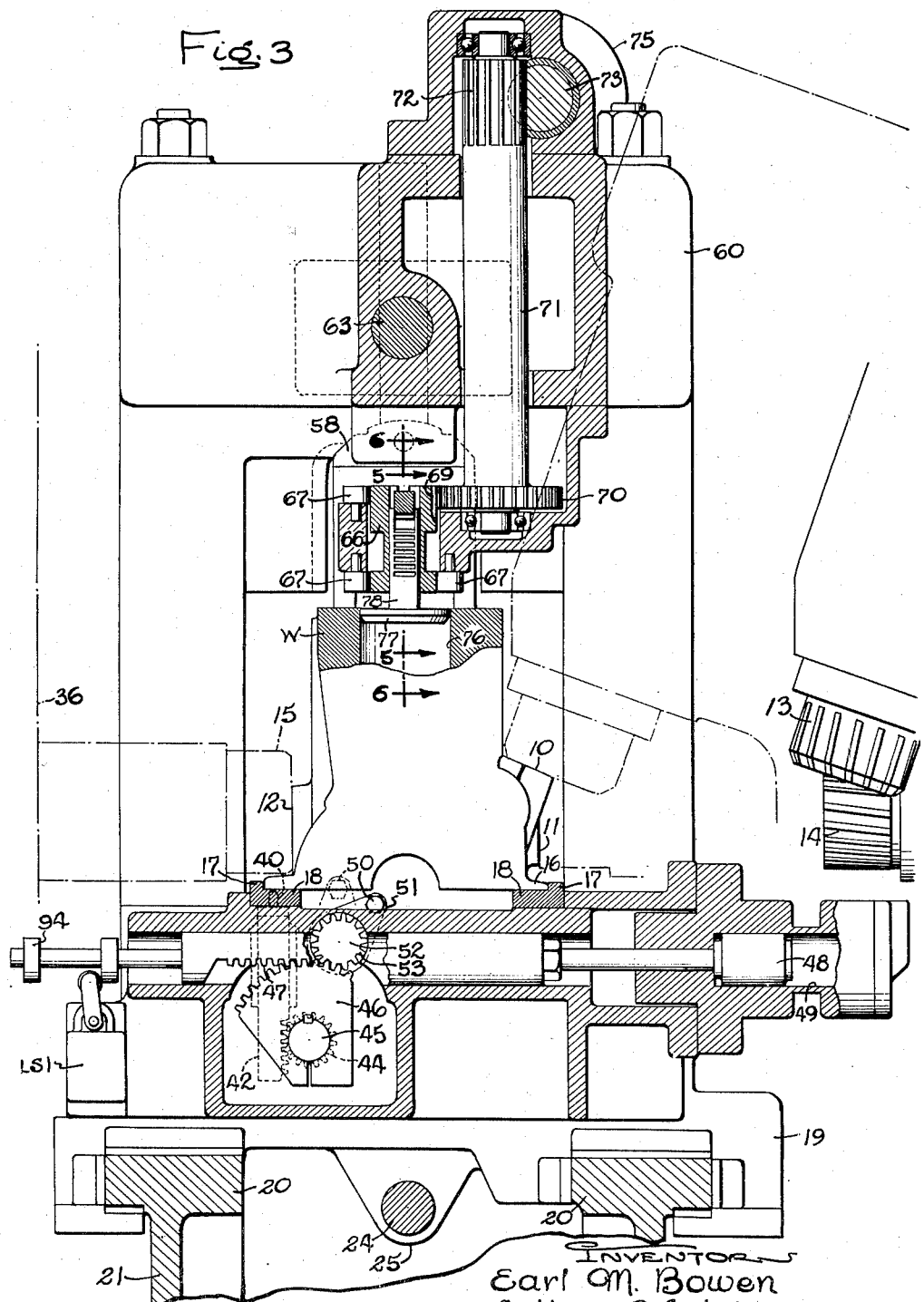

April 15, 1952  E. M. BOWEN ET AL  2,593,254
MACHINE TOOL
Filed Aug. 2, 1946  5 Sheets-Sheet 4
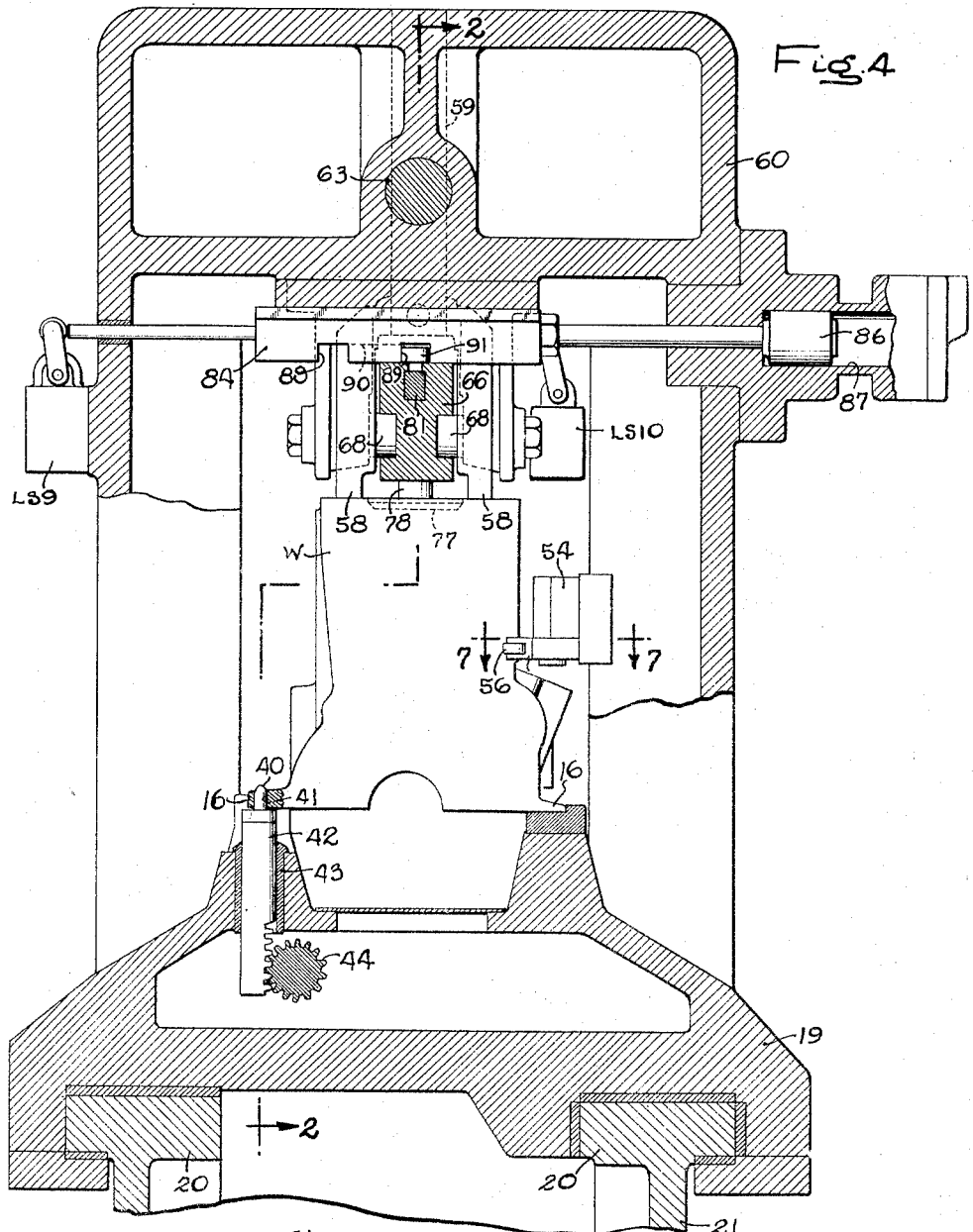
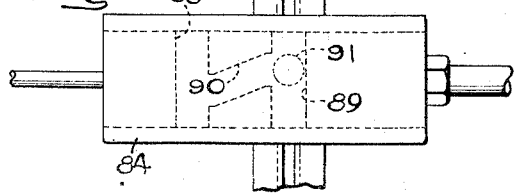
INVENTORS
Earl M. Bowen
Arthur W. Johnson
ATTORNEYS

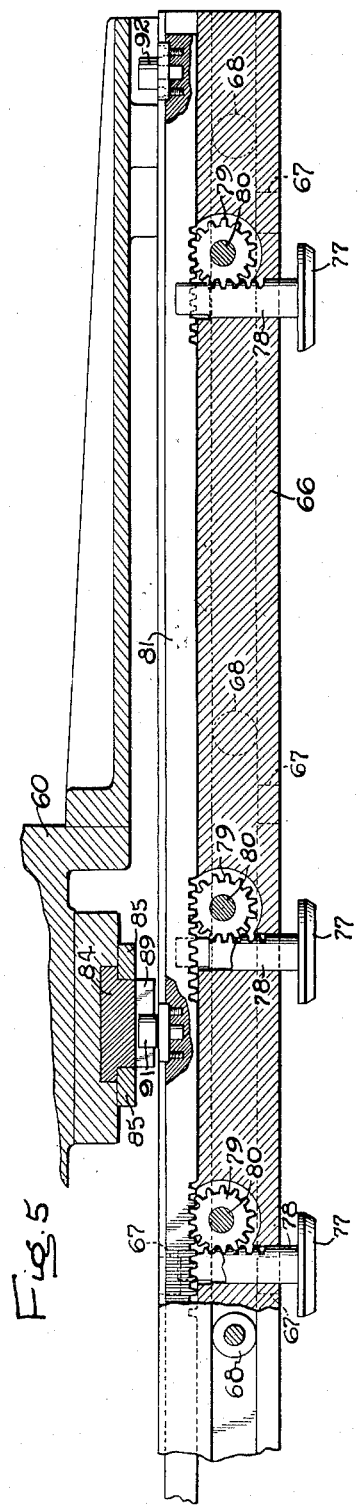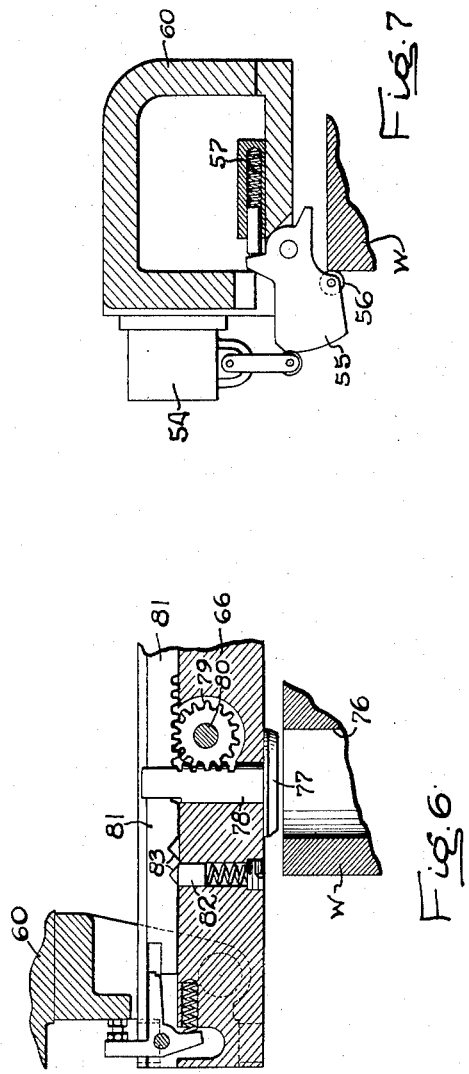

Patented Apr. 15, 1952

2,593,254

UNITED STATES PATENT OFFICE 2,593,254

MACHINE TOOL

Earl M. Bowen and Arthur W. Johnson, Rockford, Ill., assignors to The Ingersoll Milling Machine Company, Rockford, Ill., a corporation of Illinois Application August 2, 1946, Serial No. 687,834

9 Claims. (Cl. 90—21)

This invention relates to a machine tool for removing metal from each of a succession of workpieces which are advanced step by step through the machine.

The general object is to provide a machine tool of the above character which provides optimum safety to the workman in feeding workpieces to the machine, which automatically locates and secures each workpiece in proper position for the performance of the metal removing operation thereon, which provides a high production capacity by avoiding the necessity of a long relative approach of the work and cutters, and which enables a substantial number of operations to be performed on the workpiece simultaneously.

A more detailed object is to provide a machine tool having a movable work carriage with automatic mechanism for transferring workpieces onto and off from the carriage in pairs.

Another object is to mount the work transferring mechanism on the work carriage for movement relative thereto.

A further object is to utilize a single transfer mechanism for loading one workpiece onto the movable carriage, and also for removing the previously machined workpiece off from the carriage.

Still another object is to coordinate the motions of movable work locating elements on the carriage with a retractable stop which determines the loading position of the workpiece next to be machined.

The invention also resides in the novel construction of the work transferring mechanism and in the manner of correlating its motions with those of the other operating parts.

Other objects and advantages of the invention will become apparent from the following detailed description taken in connection with the accompanying drawings, in which.

Figure 2:
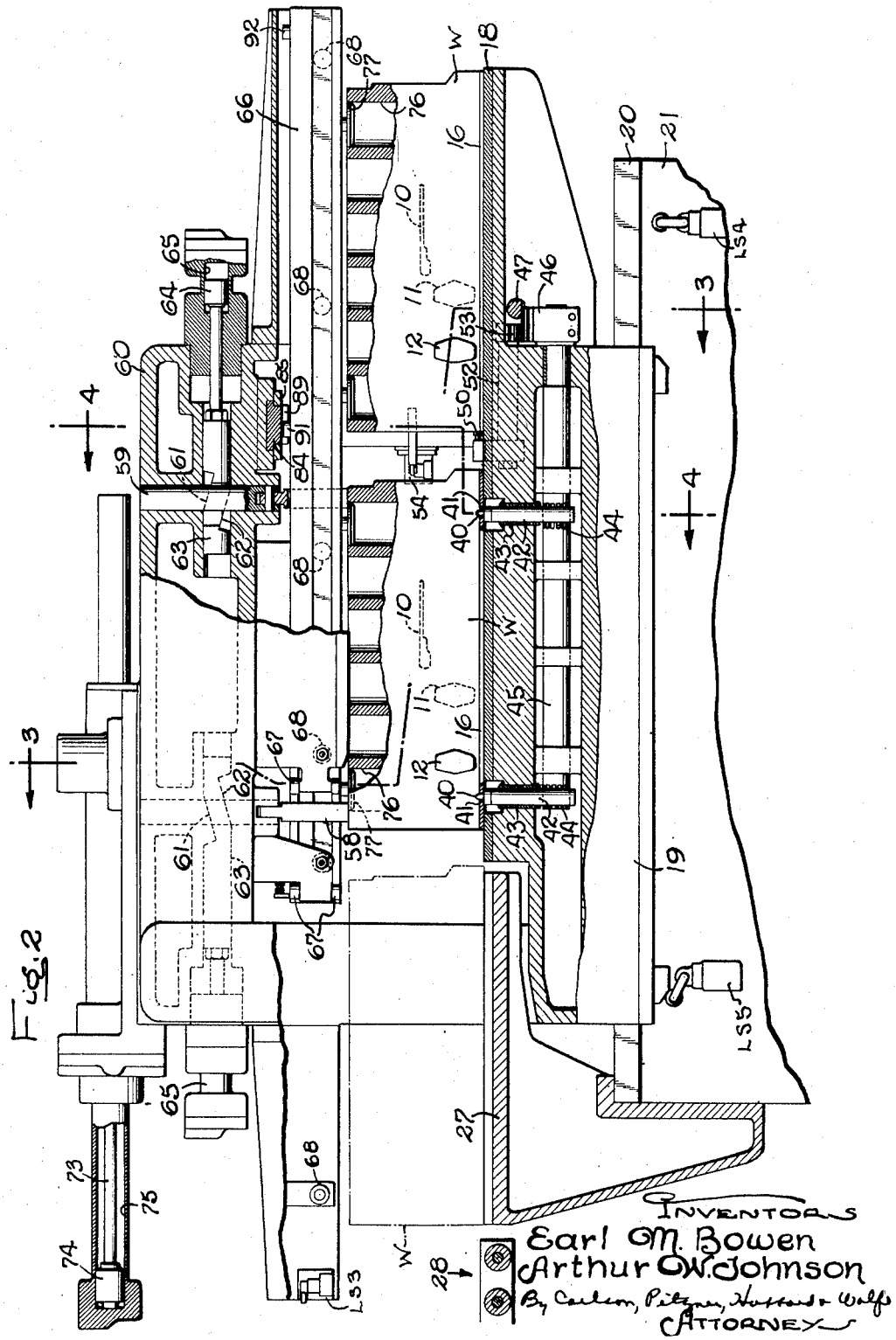
Fig. 2 is a fragmentary side elevational view broken away to show a section taken along the line 2—2 of Fig. 4.

Figs. 3 and 4 are fragmentary sectional views taken respectively along the lines 3—3 and 4—4 of Fig. 2.

Figs. 5 and 6 are fragmentary sectional views taken along the lines 5—5 and 6—6 of Fig. 3.

Fig. 7 is a fragmentary sectional view taken along the line 7—7 of Fig. 4.

Fig. 8 is a fragmentary plan view of the pawl actuating cam.

For purposes of illustration, the invention is shown in the drawings embodied in a machine for milling pads 10 and 11 on one side of an engine block W and a pad 12 on the opposite side. These operations are performed by cutters 13, 14, and 15 during the feeding of the engine block endwise along the line of advance of successive blocks to be milled. During machining, the bottom flange 16 of the workpiece is disposed between upstanding flanges 17 on hardened rails 18 on which the workpiece rests and to which it is secured. These rails are fast on the top of a carriage 19 slidable along guides 20 on a bed 21.

The carriage is fed in the direction of advance of the workpieces through the machine and rapidly traversed in the opposite direction through a relatively short stroke, about nine inches in this instance, this being accomplished herein by an hydraulic actuator comprising a horizontal cylinder 22 (Fig. 1) on the bed and a piston 23 therein having its rod 24 connected to a lug 25 depending from the underside of the carriage. The ends of the cylinder determine the limits of the forward feed of the carriage to the limit position shown in Fig. 2 and rapid return of the carriage to the position shown in Fig. 1 in which the rear end of the carriage is disposed adjacent to a roller type conveyor 26 along which workpieces may be moved successively and slid manually onto the rear end portion of the carriage. In the advanced position of the carriage, the leading end of the latter is disposed adjacent a stationary platform 27 whose upper surface is flush with the work supporting surface of the carriage so as to receive the machined workpiece pushed off from the forward end of the carriage. From the platform 27, the workpieces may be pushed onto a conveyor 28 and thereby advanced away from the machine.

The cutters 13 and 14 are mounted for movement transversely of the carriage motion between advanced and retracted positions respectively shown in phantom and full outline in Fig. 3. When in advanced position, the cutters are adapted for engagement with the pads 10 and 11. These cutters are fast on spindles driven by a motor 29 (Fig. 1) and carried by a head 30 slidable along horizontal ways 31 on a wing 32 of the bed. A lug 33 on the head 30 is connected to the rod of a piston 34 reciprocable in a cylinder 35 to limits determined by the spacing of the cylinder ends. In a similar way, the cutter 15 is mounted on a head 36 (Figs. 1, 3 and 7) slidable along ways 37 on a wing 38 on the other side of the bed and moved by a similar hydraulic actuator (not shown).

Preparatory to clamping and machining, each workpiece is located accurately on the leading end portion of the carriage 19 by engagement with one or more elements such, for example, as dowel pins 40 adapted to be projected upwardly into holes 41 (Fig. 4) in the workpiece flange 16. These pins are on plungers 42 vertically guided in bushings 43 on the carriage and having rack teeth that mesh with pinions 44 on a shaft 45 which carries a gear segment 46. The latter meshes with a horizontal rack 47 (Figs. 2 and 3) guided in the carriage and connected to the rod end of a piston 48 (Fig. 3) movable in a cylinder 49 between one position in which the dowels are lowered (Fig. 3) and a second position (Fig. 2) in which the dowels are projected into the holes 41 in the workpiece then resting on the carriage.

For a purpose to appear later, the motion of the dowels is correlated with that of a stop 50 (Figs. 2 and 3) by which the workpiece next to be machined is located in a loading position on the trailing end portion of the carriage. This stop is formed by the head of a screw threaded into the end of an arm 51 fast on a shaft 52 which is journaled on the carriage 19 and carries a pinion 53 meshing with the teeth of the gear segment 46. The arrangement is such that when the dowel pins are raised (Fig. 2), the stop 50 is also raised as shown in Fig. 2 and in phantom in Fig. 3 so as to limit the advance of a workpiece pushed from the conveyor 26 onto the trailing end portion of the carriage between the rail flanges 17 by which the workpiece is positioned laterally. As the dowel pins are lowered to permit sliding of the machined workpiece off from the carriage, the stop 50 is also lowered as shown in Fig. 3 below the workpiece, thereby permitting the latter to be advanced along the top of the carriage in unison with the machined workpiece as the latter is pushed off from the carriage onto the platform 27. The workpieces supported in a line along the conveyor 26 may be pushed manually off from this conveyor into loading position on the rear end of the carriage 19 at any time when the stop 50 is raised. This is because the stroke of the carriage is considerably shorter than the length of the workpiece, and, therefore, there is only a short space between the conveyor 26 and the carriage even when the carriage is in its most advanced position.

Proper positioning of the workpiece against the stop 50 is detected by closure of a sensitive switch 54 (Figs. 2 and 7) mounted on the carriage and having a pivoted actuating member 55 carrying a roller 56 which is engaged by the leading end surface of the workpiece and operated to close the switch in the final short movement of the workpiece against the stop 50. Normally, the detector switch is held open by a spring 57 acting on the cam 55.

After location by the dowel pins 40, the workpiece is secured to the carriage by two U-shaped clamps 58 (Figs. 2, 3, and 4) pivotally suspended from the lower ends of bars 59 vertically slidable in an inverted U-shaped superstructure 60 upstanding from the carriage 19 and rigid therewith. The bars 59 constitute the followers of inclined cam surfaces 61 and 62 (Fig. 2) on horizontally slidable plungers 63 connected to the rods of pistons 64 in hydraulic cylinders 65 to which pressure fluid is admitted to advance the plungers and apply the clamps (Fig. 2) or to retract the clamps and release the workpiece.

In accordance with the present invention, the workpieces are shuttled step by step in pairs from the operating and loading positions on the leading and trailing portions of the carriage 19 to unloading and operating positions respectively on the platform 27 and the leading end portion of the carriage. This is accomplished by a transfer member engageable with the two workpieces and mounted on the carriage for reciprocation relative thereto in the direction of the carriage movement. In the present instance, this transfer member comprises an elongated bar 66 of I-shaped cross section mounted on the superstructure 60 and guided laterally between rollers 67 (Figs. 2 and 3). The bar is supported by rollers 68 that project into the channels on opposite sides of the bar, these rollers being located at spaced intervals along the length of the bar.

To reciprocate the bar, rack teeth 69 (Fig. 3) are formed along one side thereof and mesh with a gear 70 on the lower end of the vertical shaft 71 journaled in the superstructure 60 and having a pinion 72 at its upper end meshing with rack teeth on the rod 73 of the piston 74. The latter is reciprocable in a horizontal cylinder 75 through a stroke which, owing to the gear ratio employed, is less than the movement imparted to the transfer bar 66, which motion is just sufficient to advance a workpiece resting on the carriage 19 against the stop 50 to a position on the leading end of the carriage in which the dowel holes in the workpiece register with the pins 40. This motion is sufficient to advance the machined workpiece off from the carriage and onto the unloading platform 27. Such advance of the transfer bar takes place when the carriage is in its foremost position (Fig. 2), that is after the work surfaces 10, 11, and 12 have been milled and have passed out of engagement with the cutters which are retracted before the transfer motion occurs.

Connection of the transfer bar to the workpieces in the different positions of the latter and disconnection of the bar therefrom at the proper time in the machine cycle are effected in this instance by pawls which are projected into and out of recesses in the workpiece, the recesses in this instance being the upwardly opening cylinders 76 in the engine block. Herein, the pawls are in the form of disks 77 which are received in the cylinders with sufficient looseness to enable the block, when in working position with the pawls entered, to be shifted laterally as may be required in order to permit full entry of the dowel pins 40 in locating the workpiece on the carriage. The disks 77 are secured to the lower ends of plungers 78 each having rack teeth which mesh with a pinion 79 journaled on a cross-shaft 80 on the bar 66. The pinions for all of the four pawls mesh with rack teeth on an elongated slide 81 mounted in guides along the top of the transfer bar 66 to slide longitudinally of the bar through a distance sufficient to move the disks 77 between an inactive position above the workpiece (Fig. 6) and an active position in which the disks are projected into the cylinders 76 as shown in Figs. 2 and 3. The limit positions of the pawl slide 81 are retained by a spring actuated detent 82 carried by the transfer bar and adapted to enter one or the other of two notches 83 on the slide.

Herein, the pawl slide is actuated by movement of a cross slide 84 mounted in guides 85 on the underside of the superstructure 60 and disposed immediately above the slide 81 at right angles thereto. The cross slide is connected to the end of a piston 86 (Fig. 4) reciprocable in a cylinder 87 of a length determined by the spacing of parallel slots 88 and 89 (Figs. 4 and 8) formed on the underside of the cross slide and extending parallel to the motion of the transfer bar 66. These slots are connected by an inclined cam groove 90 (Figs. 4 and 8) which, together with the slots 88 and 89, is wide enough to receive either of two follower rollers 91 and 92 (Fig. 5) mounted on the upper side of the slide 81 at points thereon spaced according to the length of the transfer bar movement. Thus, when the bar is in its retracted position shown in Fig. 5, the roller 91 is disposed in the slot 89 (Figs. 4 and 8), the pawls then being lowered. Now, when pressure fluid is admitted to the broad end of the cylinder 87, the cross slide 84 is moved to the right as viewed in Fig. 8, the roller 91 moving along the cam groove 90 and into the slot 88 to advance the slide 81 and raise the pawls 77 out of the workpieces. In the subsequent advance of the transfer bar 66, the roller 91 passes out of the slot 88 and the other roller 92 is brought into this slot when the transfer bar becomes fully retracted. The cam 90 is thus conditioned for actuation of the pawls in the new position of the transfer bar.

The four pawls 77 are arranged in pairs and spaced to enter the front and rear cylinders 76 of the two engine blocks which are in operating and loading positions on the carriage 19. In view of the two-way connections which the pawls form between the transfer bar and the workpieces, a predetermined spacing of the two blocks is always maintained in spite of the rapidity with which the transfer motion may be effected.

The various hydraulic actuators for the carriage 19, the cutters 13, 14, and 15, the clamps 58, the transfer member 66, the dowel pins 40, and the pawls 77 are supplied with pressure fluid at the proper rates of flow and in the proper directions by control valves (not shown) constructed as is well understood in the art and actuated by electromagnets. Through the use of switches actuated at the limits of the various motions together with the usual interlocks, the valves are actuated in the proper sequence to cause execution of an automatic cycle during which a workpiece is transferred into operating position on the carriage, is milled by the cutter, and transferred off onto the platform 27. The workpieces are pushed manually one by one onto the carriage 19 and against the stop 50 at any time during the machining of a previously loaded workpiece.

*Operation*

Figure 1:
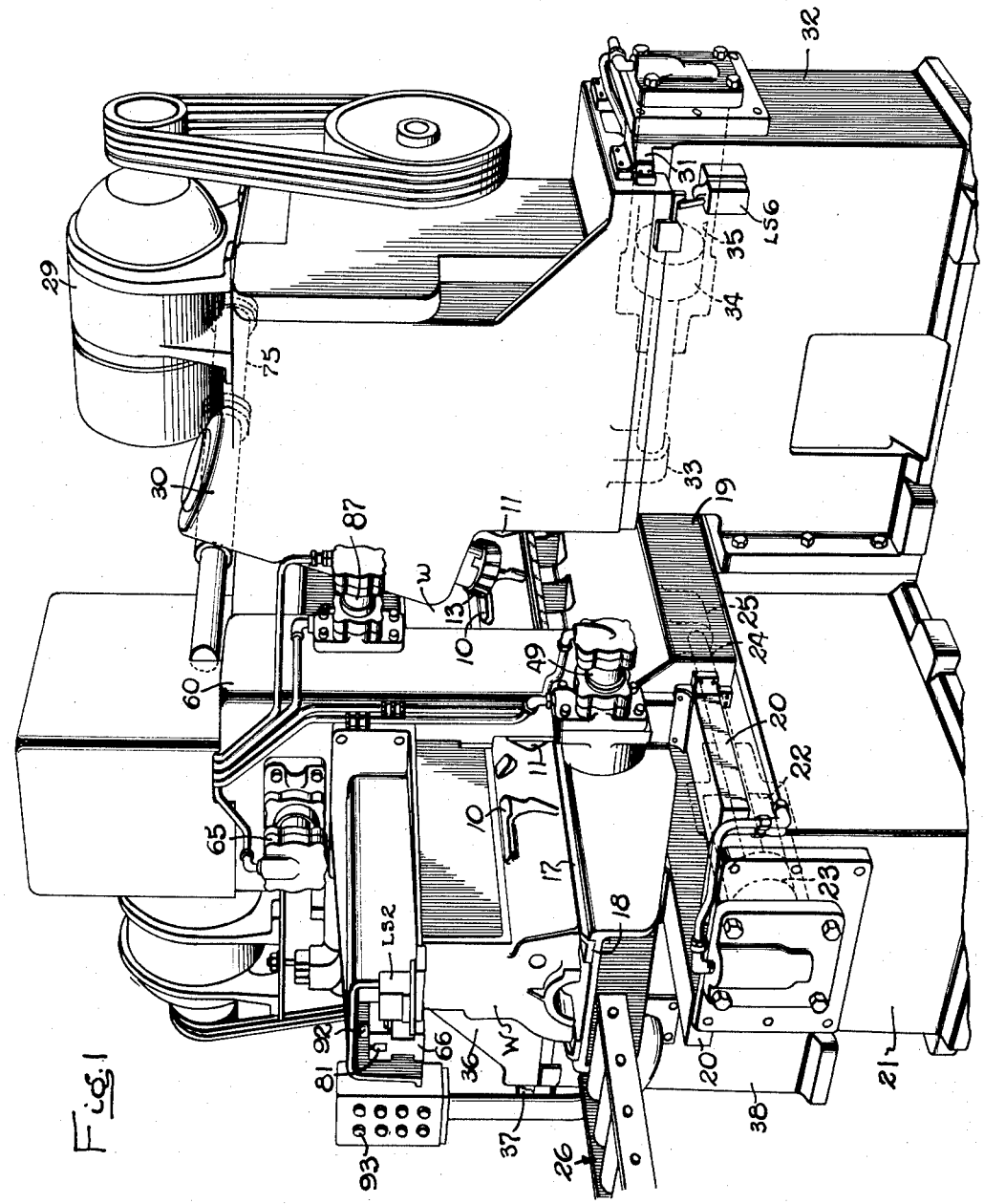
Figure 1 is a perspective view of a machine tool embodying the novel features of the present invention.

Each cycle of the machine is terminated automatically at the completion of the forward feeding motion of the carriage 19 to close a switch LS–5 (Fig. 2) which is followed by unclamping of the workpiece and retraction of the cutter heads 30 and 36 to close switch LS–6 (Fig. 1). At this time, the transfer bar 66 is fully retracted (Figs. 1 and 2) closing the switch LS–2 (Fig. 1), the pawls 77 are retracted out of the cylinders of both workpieces on the carriage closing the switch LS–10 (Fig. 4), and the dowel pins 40 are raised opening switch LS–1. By this time, the operator will have moved a new workpiece onto the rear end of the table against the stop 50 thereby closing the detector switch 54.

With the parts thus positioned, a new cycle may be initiated by pushing a button 93 (Fig. 1) to close a circuit through the switch LS–2 and the detector switch 54 to energize the dowel pin and pawl actuators 48 and 49 and 86, 87, thereby lowering the dowel pins 40 out of engagement with the machined workpiece and simultaneously lowering the stop 50 and the pawls 77 to enter the latter in the workpieces. The motions result in closing switches LS–1 (Fig. 3) and LS–9 (Fig. 4) which energizes the transfer bar actuator 74, 75. The transfer bar 66 is thus moved forwardly relative to the carriage 19, the pawls 77 carrying the two workpieces forwardly a distance sufficient to bring the trailing piece to operating position in register with the dowels 40. The leading piece is pushed off from the carriage 19 and onto the platform 27 to the position shown in phantom in Fig. 2.

At the forward limit of the advance of the transfer bar, a switch LS–3 (Fig. 2) is closed, thereby energizing the hydraulic actuator 48, 49 to raise the stop 50 and the dowel pins 40, the latter locating the new workpiece accurately in operating position. A switch LS–1 (Fig. 3) is actuated by a dog 94 in the final portion of this dowel motion thereby energizing the clamp actuators 64, 65 to lower the clamps 58 and secure the workpiece to the carriage. Closure of the switch LS–1 also energizes the actuator 86, 87 to move the cross slide 84 in a direction to raise the four pawls 77 out of engagement with the two workpieces, a switch LS–10 becoming closed at the completion of this motion.

The switch LS–10 together with another switch which is closed in response to a predetermined fluid pressure build-up in the clamp actuators energizes the transfer actuator 74, 75 to effect retraction of the transfer bar 66 relative to the carriage 19 so as to bring the two foremost pawls 77 into alinement with the cylinders 76 of the workpiece on the leading end of the table and to bring the other two pawls into position above the rear end of the table, the pawls 77 remaining raised so that a new workpiece may, at any time after raising of the stop 50 and the pawls 77, be moved onto the table. The combined closure of the pressure switch and the switch LS–10 above referred to also completes a circuit for energizing the actuator 22, 23 in a direction and at a rate to effect rapid retraction of the carriage to carry the rough work surfaces past the cutter, this being a distance of about nine inches. Rapid return of the carriage 19 and return of the transfer bar 66 occur simultaneously.

At the end of the carriage return, a switch LS–4 (Fig. 2) is actuated to effect energization of the actuators for the tool heads 30 and 36, thereby advancing the latter into operative position. Switches including LS–6 (Fig. 1) are actuated in the final part of this motion to cause energization of the carriage actuator 22, 23 to initate forward feeding of the carriage during which the work surfaces 10, 11 and 12 are milled. At the completion of this motion (Fig. 2), a switch LS–5 (Fig. 2) is closed to cause energization of the actuators for retracting the cutter heads 30 and 36 to actuate switches LS–6 for energizing the actuators 64, 65 to effect unclamping of the finished workpiece. The cycle is then complete and the parts remain at rest until the initiation of the next cycle by again pushing the button 93.

At any time after the dowels 40 and the stop 50 have been raised near the start of the cycle, the operator may load a new workpiece onto the carriage 19 and push it against the stop 50. This closes the detector switch 54 which, together with the switch LS-2 then closed by the transfer bar in retracted position conditions the cycle starting circuit above described for initiation of the next cycle in the manner above described.

With the transfer bar mounted on the work carriage and operated as above described in transferring workpieces into as well as out of operating position on the carriage, optimum safety is obtained in the manual loading of the machine. At the same time, the necessity of a rapid approach between the cutters and the work is avoided, the cutting stroke being limited to a short feeding motion only sufficient for the cutters to pass the work surfaces.

We claim as our invention:

1. A machine tool having, in combination, a carriage reciprocable back and forth and adapted to support two workpieces in spaced end to end relation, a cutter operable in the advance of said carriage to machine the leading one of said two workpieces, a transfer member mounted on said carriage for movement relative thereto along the path of reciprocation thereof, power actuated means for feeding said carriage forwardly a distance sufficient to machine the leading workpiece on the carriage and retracting the carriage a corresponding distance, means on said member engageable with and disengageable from both of said workpieces, means operable after the feeding movement of said carriage to actuate said transfer member and advance both of the workpieces along the carriage to carry the machined piece off from the carriage and to bring the trailing piece into the leading position thereon, a stop mounted on said carriage in position to limit the advance of workpieces onto the carriage and locate the same in said trailing position, said stop being retractable to permit advance of the workpiece along the carriage to said leading position, a dowel engageable with the leading workpiece on the carriage to locate the same accurately thereon, and means for retracting said stop and said dowel after the feeding movement of the carriage.

2. A machine tool comprising, in combination, a bed, a carriage reciprocable back and forth along the bed and adapted to support two workpieces in end to end relation in operating and loading positions spaced along the carriage, means for guiding the workpieces for movement endwise of the carriage, a transfer member mounted on said carriage for bodily movement therewith and for endwise reciprocation relative thereto along the path of movement of the carriage, power actuated pawls on said member movable relative thereto into engagement with both workpieces on said carriage to form a two-way connection therewith, said pawls being retractable to disconnect said workpieces and the transfer member, and power operated means on said carriage for reciprocating said transfer member to advance said workpieces simultaneously along the carriage to carry the piece in said operating position off from the carriage and to move the piece in said loading position into said operating position.

3. A machine tool comprising, in combination, a bed, a carriage reciprocable back and forth along the bed and adapted to support two workpieces in end to end relation in operating and loading position spaced along the carriage, means for guiding the workpieces for movement endwise of the carriage, a transfer member mounted on said carriage for bodily movement therewith and for endwise reciprocation relative thereto along the path of movement of the carriage, means on said member engageable with both work pieces on said carriage to connect and disconnect the two, power operated means on said carriage for reciprocating said transfer member to advance said workpieces simultaneously along the carriage to carry the piece in said operating position off from the carriage and carry the piece in said loading position into operating position, and power actuated means for moving said carriage in opposite directions.

4. In a machine tool of the character described, the combination of, a carriage for supporting a workpiece and mounted for reciprocation between opposite limit positions, a transfer member mounted on said carriage for movement back and forth along the path of reciprocation thereof, a pawl carried by said member and movable relative thereto into and out of engagement with a workpiece on said carriage, a slide on said member reciprocable along the member to actuate said pawl, a cross slide mounted on said carriage to move back and forth transversely of the path of said reciprocation and carrying a cam for actuating said slide, followers on said slide respectively engageable with said cam in opposite limit positions of said carriage, and power actuated means for moving said cross slide in opposite directions.

5. In a machine tool of the character described, the combination of, a work support, a transfer member mounted for movement back and forth along the work support, a pawl carried by said member and movable into and out of engagement with a workpiece on said work support, a slide on said member reciprocable relative to the member to actuate said pawl, a cross slide mounted to move back and forth transversely of the path of movement of said member and carrying a cam for actuating said slide, a follower on said slide engageable with said cam, and means for moving said cross slide in opposite directions to actuate said slide relative to said transfer member.

6. In a machine tool, the combination of a work support, a transfer member mounted on said support for reciprocation relative thereto, pawls mounted on said member for movement relative thereto into and out of engagement with said workpieces, a slide mounted on said transfer member for movement relative thereto to actuate said pawls, a power actuator for said slide, and means selectively operable at opposite limits of travel of said transfer member to connect said actuator to said slide.

7. A machine tool having, in combination, a support adapted to support two workpieces in two spaced positions along a predetermined line of travel, an element mounted on said support for movement relative thereto to engage and disengage the leading one of said workpieces and locate the same relative to the support, a stop mounted on said support in a position to engage the other workpiece to locate the same in said second position when such workpiece is moved horizontally onto said support along said line of travel, said stop being retractable to a position permitting further movement of the engaged workpiece in said line of travel along the support from said second to said first position, means interconnecting said locating element and said stop for movement in unison into and out of active positions, and a transfer member engageable with both of said workpieces in said positions and movable along said path of travel when said element and stop are retracted out of engagement with the workpieces whereby to advance the workpieces one step and bring the trailing workpiece into said first position and correspondingly advance the leading workpiece.

8. A machine tool having, in combination a carriage reciprocable back and forth and adapted to support two workpieces in spaced end to end relation, a cutter operable in the advance of said carriage to machine the leading one of said two workpieces, a transfer member mounted on said carriage for movement relative thereto along the path of reciprocation thereof, power actuated means for feeding said carriage forwardly a distance sufficient to machine the leading workpiece on the carriage and retracting the carriage a corresponding distance, means on said member engageable with and disengageable from both of said workpieces, means operable after the feeding movement of said carriage to actuate said transfer member and advance both of the workpieces along the carriage bringing the trailing piece into the leading position thereon, a dowel mounted on said carriage for movement relative thereto into and out of engagement with the leading workpiece on the carriage to locate the same accurately thereon, and means for retracting said dowel after the feeding movement of the carriage.

9. A machine tool comprising, in combination, a bed, a carriage reciprocable back and forth along the bed and adapted to support two workpieces in end to end relation in positions spaced along the carriage, means for guiding the workpieces for movement endwise of the carriage, a transfer member mounted on said carriage for bodily movement therewith and for endwise reciprocation relative thereto along the path of movement of the carriage, means associated with said member and engageable with both workpieces on said carriage to disconnect the workpieces and the member or to couple the workpieces and the member for movement together along the carriage guideway, power operated means on said carriage for reciprocating said transfer member to advance said workpieces simultaneously along the carriage, and power actuated means for moving said carriage in opposite directions.

EARL M. BOWEN.
ARTHUR W. JOHNSON.

REFERENCES CITED

The following references are of record in the file of this patent:

UNITED STATES PATENTS

| Number | Name | Date |
|---|---|---|
| 1,896,059 | Wainwright | Jan. 31, 1933 |
| 1,942,209 | Graves et al. | Jan. 2, 1934 |
| 2,004,540 | Smith et al. | June 11, 1935 |
| 2,017,865 | Morgan | Oct. 22, 1935 |
| 2,108,823 | Lyon | Feb. 22, 1938 |
| 2,155,864 | Krause | Apr. 25, 1939 |
| 2,160,476 | Kampmeier | May 30, 1939 |
| 2,244,413 | Armitage | June 3, 1941 |
| 2,249,230 | Schafer | July 15, 1941 |
| 2,395,518 | Svenson | Feb. 26, 1946 |
| 2,407,970 | Andrew et al. | Sept. 24, 1946 |